(12) United States Patent
Lee et al.

(10) Patent No.: US 8,639,439 B2
(45) Date of Patent: Jan. 28, 2014

(54) ELECTRONIC DEVICE AND TRANSPORTION INFORMATION MANAGEMENT METHOD UTILIZED THEREBY

(75) Inventors: Hou-Hsien Lee, Taipei Hsien (TW); Chang-Jung Lee, Taipei Hsien (TW); Chih-Ping Lo, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 468 days.

(21) Appl. No.: 12/965,902

(22) Filed: Dec. 12, 2010

(65) Prior Publication Data

US 2011/0238293 A1    Sep. 29, 2011

(30) Foreign Application Priority Data

Mar. 26, 2010 (TW) .............................. 99109109 A (51) Int. Cl.
*G01C 21/00* (2006.01)
(52) U.S. Cl.
USPC ...................................................... 701/410
(58) Field of Classification Search
USPC .......................................................... 701/201
See application file for complete search history.

(56) References Cited

U.S. PATENT DOCUMENTS

| | | | | |
|---|---|---|---|---|
| 5,168,451 A * | 12/1992 | Bolger | ............... | 701/117 |
| 5,799,263 A * | 8/1998 | Culbertson | ............... | 701/117 |
| 6,278,936 B1 * | 8/2001 | Jones | ............... | 701/454 |
| 6,411,897 B1 * | 6/2002 | Gaspard, II | ............... | 701/411 |
| 6,697,730 B2 * | 2/2004 | Dickerson | ............... | 701/465 |
| 6,813,556 B2 * | 11/2004 | Watanabe | ............... | 701/117 |
| 6,952,645 B1 * | 10/2005 | Jones | ............... | 701/465 |
| 7,047,888 B2 * | 5/2006 | Richards | ............... | 104/28 |
| 7,089,107 B2 * | 8/2006 | Jones | ............... | 701/465 |
| 7,119,716 B2 * | 10/2006 | Horstemeyer | ............... | 340/994 |
| 7,191,058 B2 * | 3/2007 | Laird et al. | ............... | 701/516 |
| 7,209,757 B2 * | 4/2007 | Naghian et al. | ............... | 455/456.3 |
| 7,706,934 B2 * | 4/2010 | Sakamoto et al. | ............... | 701/19 |
| 7,797,267 B2 * | 9/2010 | Horvitz | ............... | 706/46 |
| 7,860,647 B2 * | 12/2010 | Amano | ............... | 701/414 |
| 2007/0208502 A1 * | 9/2007 | Sakamoto et al. | ............... | 701/205 |
| 2008/0033640 A1 * | 2/2008 | Amano | ............... | 701/209 |
| 2008/0059061 A1 * | 3/2008 | Lee | ............... | 701/209 |
| 2009/0271109 A1 * | 10/2009 | Lee et al. | ............... | 701/208 |
| 2010/0125410 A1 * | 5/2010 | Hicks | ............... | 701/209 |
| 2011/0022304 A1 * | 1/2011 | Lee | ............... | 701/201 |

FOREIGN PATENT DOCUMENTS

| | | |
|---|---|---|
| CN | 101650188 A | 2/2010 |
| EP | 0671603 A1 | 9/1995 |
| JP | 2009145080 A | 7/2009 |

* cited by examiner

*Primary Examiner* — Thomas Tarcza
*Assistant Examiner* — Alex C Dunn
(74) *Attorney, Agent, or Firm* — Altis Law Group, Inc.

(57) ABSTRACT

A transportation information management method using an electronic device sets a departure location and a destination, detects a current location of the electronic device using a navigation device of the electronic device in real time, and determines whether a distance between the current location and the destination is less than a predetermined distance. If the distance is less than the predetermined distance, the electronic device generates a first notification to inform the user to prepare to disembark.

11 Claims, 6 Drawing Sheets

ELECTRONIC DEVICE AND TRANSPORTION INFORMATION MANAGEMENT METHOD UTILIZED THEREBY

BACKGROUND

1. Technical Field

Embodiments of the present disclosure relate generally to information management, and more particularly, to a transportation information management method using an electronic device.

2. Description of Related Art

Transportation information, such as bus, train, or subway schedules and routes, is often accessed using a mobile phone, a personal digital assistant (PDA), or a mobile internet device (MID). However, disembark information may not be available. As well, information required for private transportation, such as information for using of a taxi, may not be provided.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
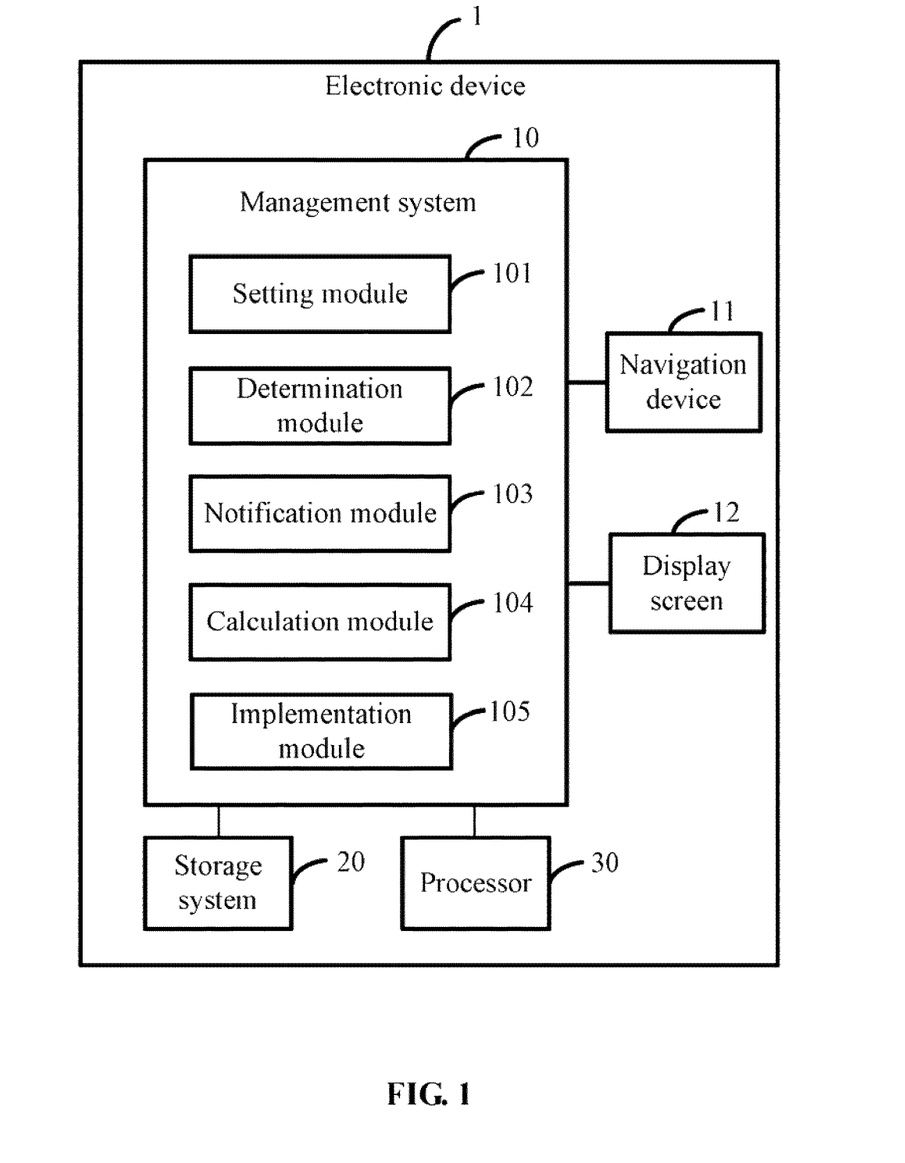
FIG. 1 is a block diagram of one embodiment of an electronic device comprising a management system.

FIG. 1 is a block diagram of one embodiment of an electronic device 1. In the embodiment, the electronic device 1 includes a management system 10, a navigation device 11, a display screen 12, a storage system 20, and at least one processor 30. The electronic device 1 may be a mobile phone, a personal digital assistant (PDA), a mobile internet device (MID), or other device. It should be apparent that FIG. 1 is only one example of architecture of the electronic device 1 that can be included with more or fewer components than shown in other embodiments, or a different configuration of the various components.

Figure 2:
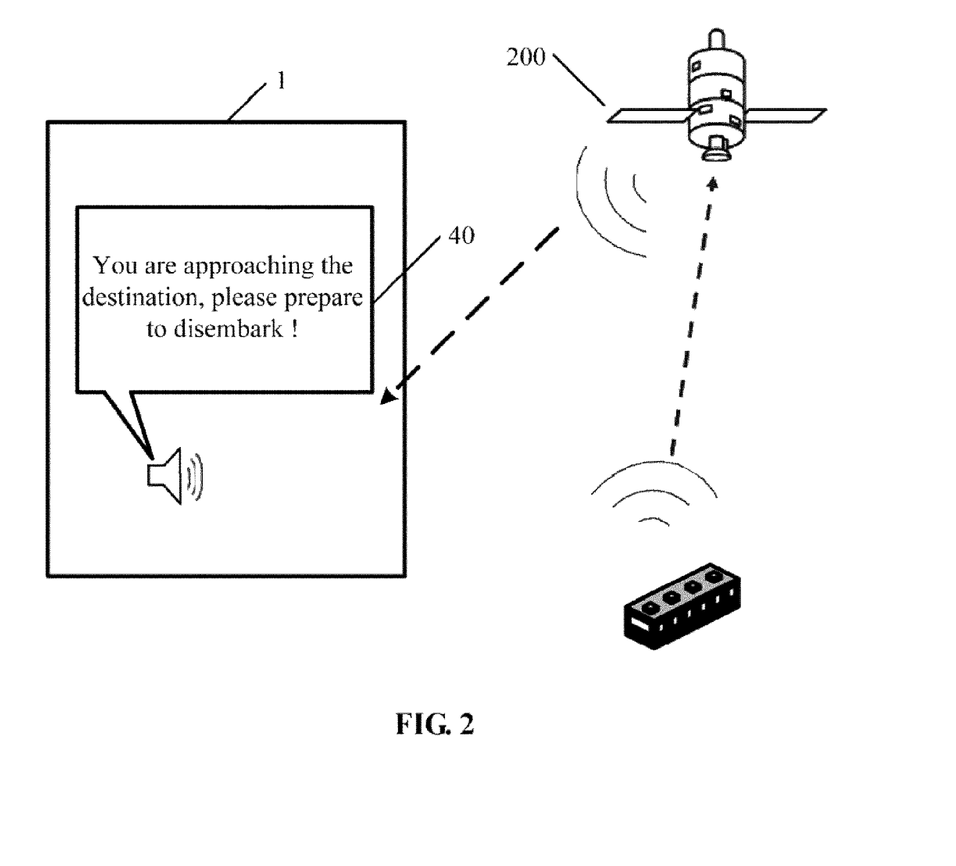
FIG. 2 is a schematic diagram illustrating one example of a display of the electronic device.

In one embodiment, the navigation device 11 may be a global positioning system (GPS) device that receives GPS signals transmitted by GPS satellites, such as a satellite 200 in FIG. 2. The navigation device 11 may provide navigation for the electronic device 1 according to one or more electronic maps prestored in the storage system 20 and the received GPS signals. For example, the navigation device 11 may determine a location of the electronic device 1 according to the received GPS signals, and calculate a distance between the determined location and a determined destination to provide to the electronic device 1 to perform the navigation. Each of the electronic maps may be downloaded from the Internet, and is stored and updated in the storage system 20 when information of the electronic maps is changed accordingly.

The storage system 20 stores one or more programs, such as programs of an operating system, and other applications of the electronic device 1. In one embodiment, the storage system 20 may be random access memory (RAM) for temporary storage of information, and/or a read only memory (ROM) for permanent storage of information. In other embodiments, the storage system 20 may also be an external storage device, such as a hard disk, a storage card, or a data storage medium. The processor 30 executes one or more computerized operations of the electronic device 1 and other applications, to provide function of the electronic device 1.

The management system 10 may include a plurality of functional modules comprising one or more computerized instructions that are stored in the storage system 20 or a computer-readable medium of the electronic device 1, and executed by the processor 30 to perform operations of the electronic device 1. In one embodiment, the management system 10 includes a setting module 101, a determination module 102, a notification module 103, a calculation module 104, and an implementation module 105. In general, the word "module", as used herein, refers to logic embodied in hardware or firmware, or to a collection of software instructions, written in a programming language, such as, Java, C, or Assembly. One or more software instructions in the modules may be embedded in firmware, such as EPROM. The modules described herein may be implemented as either software and/or hardware modules and may be stored in any type of computer-readable medium or other storage device.

The setting module 101 is operable to set a departure location and a destination, and determine a mode of transportation for the user from the departure location to the destination. The mode of transportation may include public transportation or private transportation. In the embodiment, the public transportation may be a bus, a subway, a train, or any other vehicle that runs on a determined route. The private transportation may be a taxi. The setting module 101 may determine whether the mode of transportation is public transportation or private transportation, such as use of a taxi, according to user input.

The determination module 102 detects a current location of the electronic device 1 by the navigation device 11 in real time, and determines whether a distance between the current location and the destination is less than a predetermined distance. In one embodiment, the determination module 102 may acquire the distance through the navigation device 11, and then determine whether the acquired distance is less than the predetermined distance.

The notification module 103 generates a first notification to inform the user to prepare to disembark when the distance between the current location and the destination is less than the predetermined distance. In one embodiment, the first notification may be a voice message, vibration, or a text message displayed on the display screen 12, such as a text message 40 of FIG. 2. Additionally, if the setting module determines the mode of transportation is a private transportation, the management system 10 performs extra actions to provide extra functions of the electronic device 1, details of which follow.

The calculation module 104 calculates feasible navigation routes from the departure location to the destination based on the electronic maps of the storage system 20, if the setting module determines the mode of the transportation is the private transportation. Additionally, the calculation module 104 estimates cost of each of the navigation routes according to a private transportation fare, and displays the estimated cost of each navigation route on the display screen 12. The private transportation fare may be predetermined by the user and stored in the storage system 12 through the setting module 101.

The determination module 102 determines whether a driving route and direction of the private transportation are correct according to the current location of the electronic device 1, the destination, and the feasible navigation routes. In one embodiment, if the current location of the electronic device 1 is included in one of the feasible navigation routes, the determination module 102 determines that the driving route is correct. Otherwise, if the current location of the electronic device 1 is included in none of the feasible navigation routes, the determination module 102 determines that the driving route is incorrect. Additionally, if the distance between the current location of the electronic device 1 and the destination along any of the feasible navigation routes decreases the time before arriving the destination, the determination module 102 may determines the driving direction is correct, otherwise, the driving direction is considered incorrect.

The notification module 103 generates a second notification to warn the user if the driving route or direction of the private transportation is determined incorrect. In one embodiment, the notification module 103 may generate a voice message and vibration to warn the user. In other embodiments, the notification module 103 may generate a text message to display on the display screen 12, and prompt whether to call the police department, such as the text message 50 of FIG. 3. If the user agrees to call the police department, the implementation module 105 sends a request message to the police department, and the current location of the electronic device 1 may also be sent to the police department.

Figure 4:
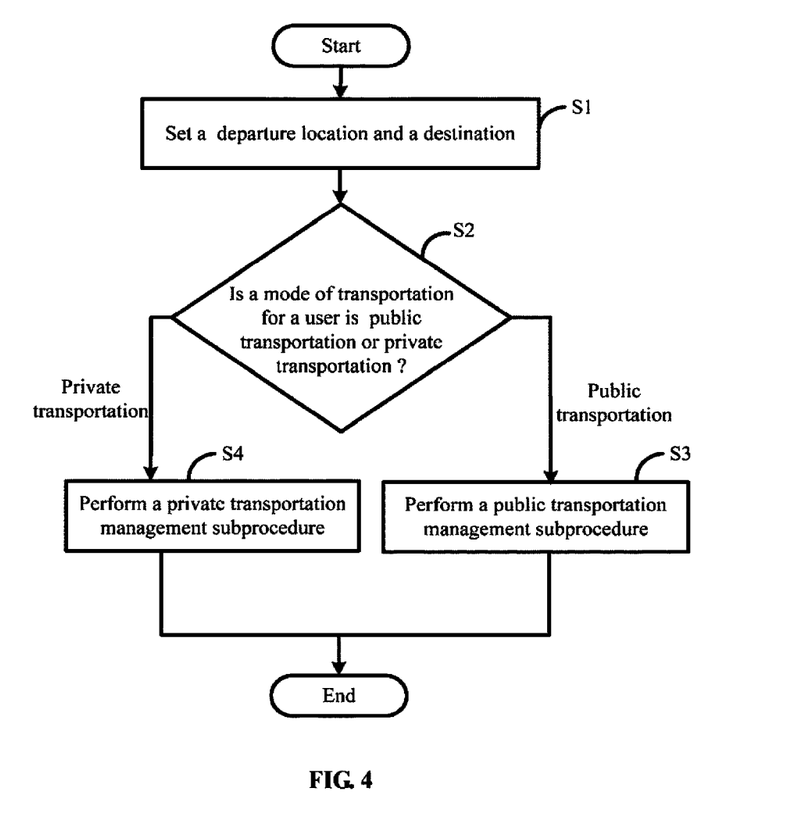
FIG. 4 is a flowchart of one embodiment of a transportation information management method used with an electronic device of FIG. 1.

FIG. 4 is a flowchart of one embodiment of a transportation information management method using the electronic device 1 of FIG. 1. Depending on the embodiment, additional blocks may be added, others removed, and the ordering of the blocks, may be changed.

In block S1, the setting module 101 sets a departure location and a destination for a user. In block S2, the setting module determines whether a mode of transportation for the user from the departure location to the destination is public transportation or private transportation. If the mode of transportation is public transportation, block S3 is implemented. Otherwise, if the mode of transportation is the private transportation, block S4 is implemented. In one embodiment, the public transportation may be a bus, a subway, a train, or any other vehicle that runs on a determined route. The departure location and the destination may be determined by user input. The setting module 101 may determine whether the mode of transportation is the public transportation or the private transportation according to user input.

Figure 5:
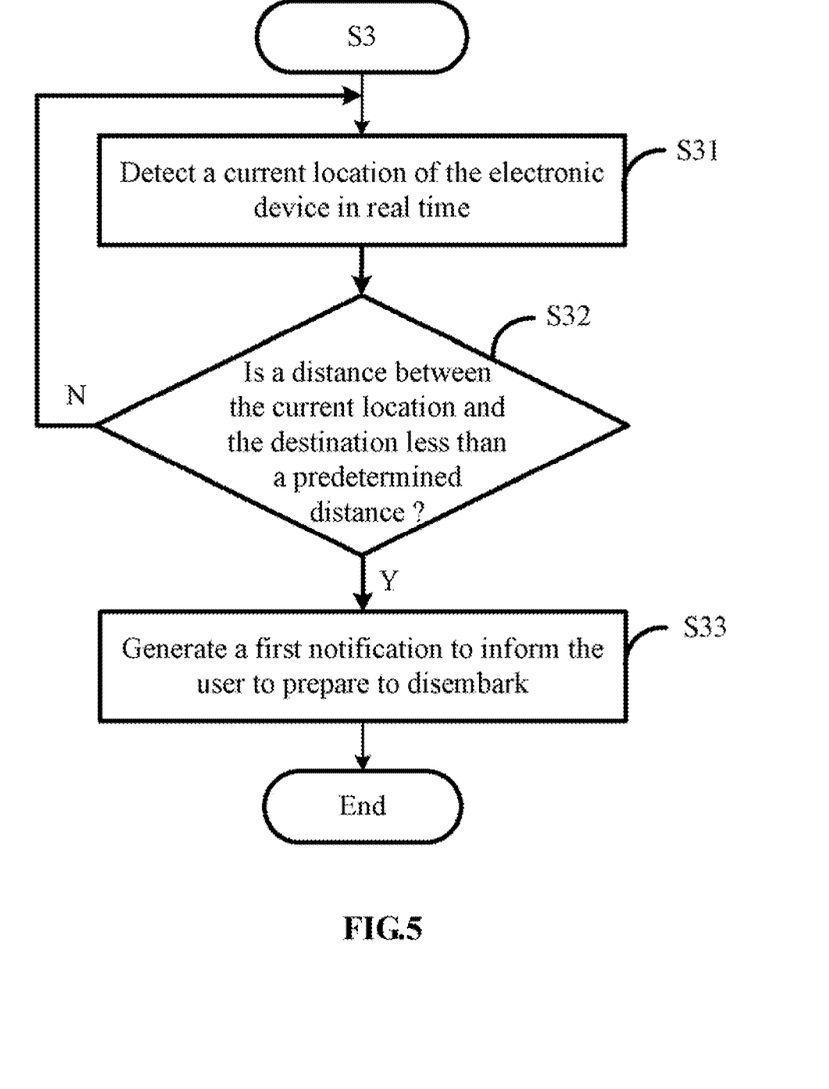
FIG. 5 is a detailed flowchart of a block S3 of FIG. 4.

In block S3, the electronic device 1 performs a public transportation management subprocedure, as shown in FIG. 5.

Figure 6:
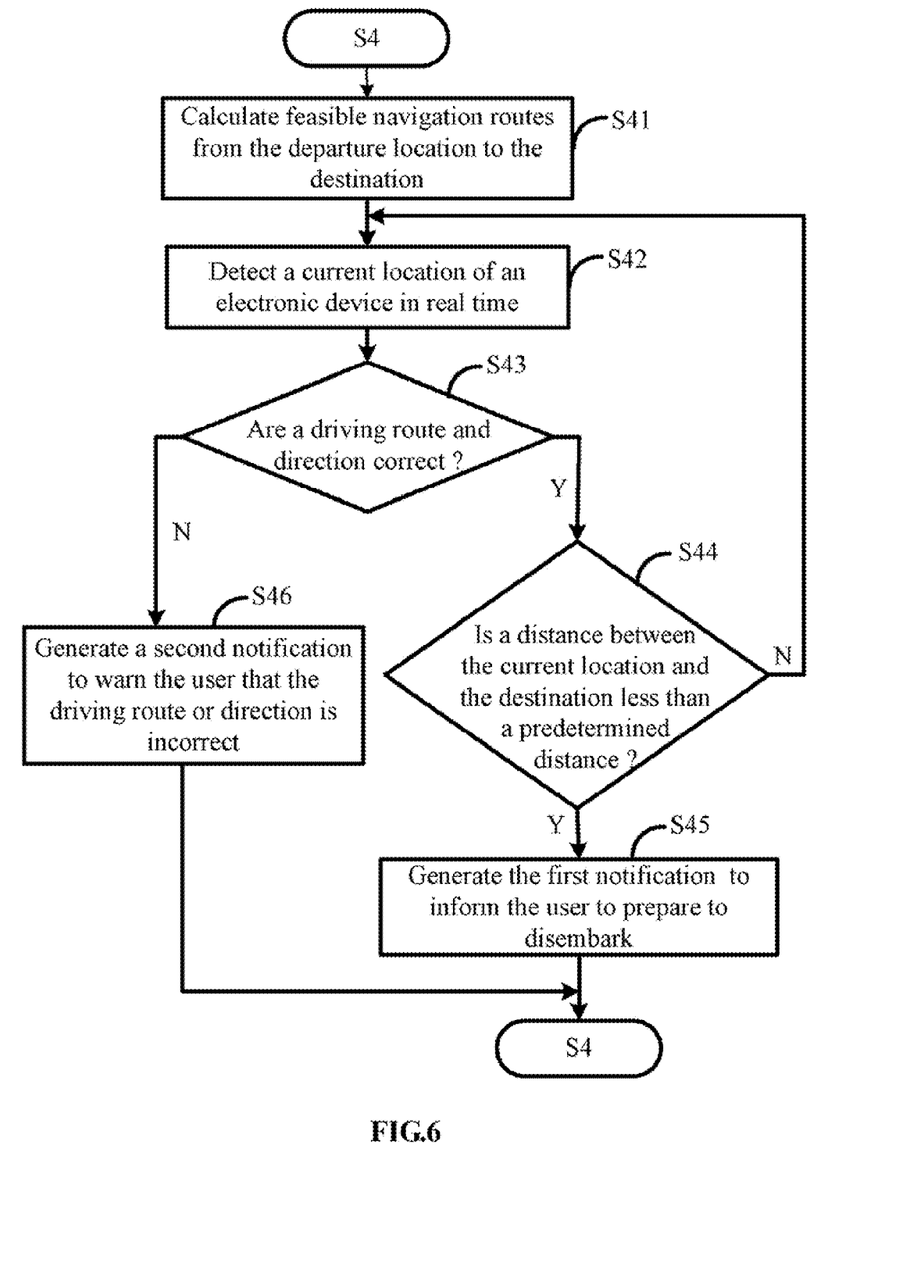
FIG. 6 is a detailed flowchart of a block S4 of FIG. 4.

In block S4, the electronic device 1 performs a private transportation management subprocedure, as shown in FIG. 6.

FIG. 5 is a detailed flowchart of block S3 of FIG. 4.

In block S31, the determination module 102 detects a current location of the electronic device 1 by the navigation device 11 in real time.

In block S32, the determination module 102 determines whether a distance between the current location and the destination is less than a predetermined distance. If the distance is less than the predetermined distance, block S33 is implemented. Otherwise, if the distance is not less than the predetermined distance, block S31 is repeated. In one embodiment, the determination module 102 may acquire the distance between the current location and the destination by the navigation device 11, and then determines whether the acquired distance is less than the predetermined distance.

In block S33, the notification module 103 generates a first notification to inform the user to prepare to disembark. In one embodiment, the first notification may be a voice message, vibration, or a text message displayed on the display screen 12 such as a text message 40 of FIG. 2.

FIG. 6 is a detailed flowchart of the block S4 of FIG. 4.

In block S41, the calculation module 104 calculates feasible navigation routes from the departure location to the destination based on the electronic maps stored in the storage system 20. Additionally, the calculation module 104 estimates cost of each navigation route according to a private transportation fare, and displays the estimated cost of each navigation route on the display screen 12. The private transportation fare may be predetermined and stored in the storage system 20 by the user through the setting module 101.

In block S42, the determination module 102 detects a current location of the electronic device 1 by the navigation device 11 in real time. In block S43, the determination module 102 determines whether a driving route and direction of the private transportation are correct according to the current location, the destination, and the feasible navigation routes. If the driving route and direction are correct, block S44 is implemented. Otherwise, if the driving route or direction is incorrect, block S46 is implemented.

In block S44, the determination module 102 determines whether a distance between the current location and the destination is less than the predetermined distance. If the distance is less than the predetermined distance, block S45 is implemented. Otherwise, if the distance is not less than the predetermined distance, block S42 is repeated.

In block S45, the notification module 103 generates the first notification to inform the user to prepare to disembark.

In block S46, the notification module 103 generates a second notification to warn the user that the driving route or direction of the private transportation is determined incorrect. In one embodiment, the notification module 103 may generate a voice message or a vibration to warn the user.

Figure 3:
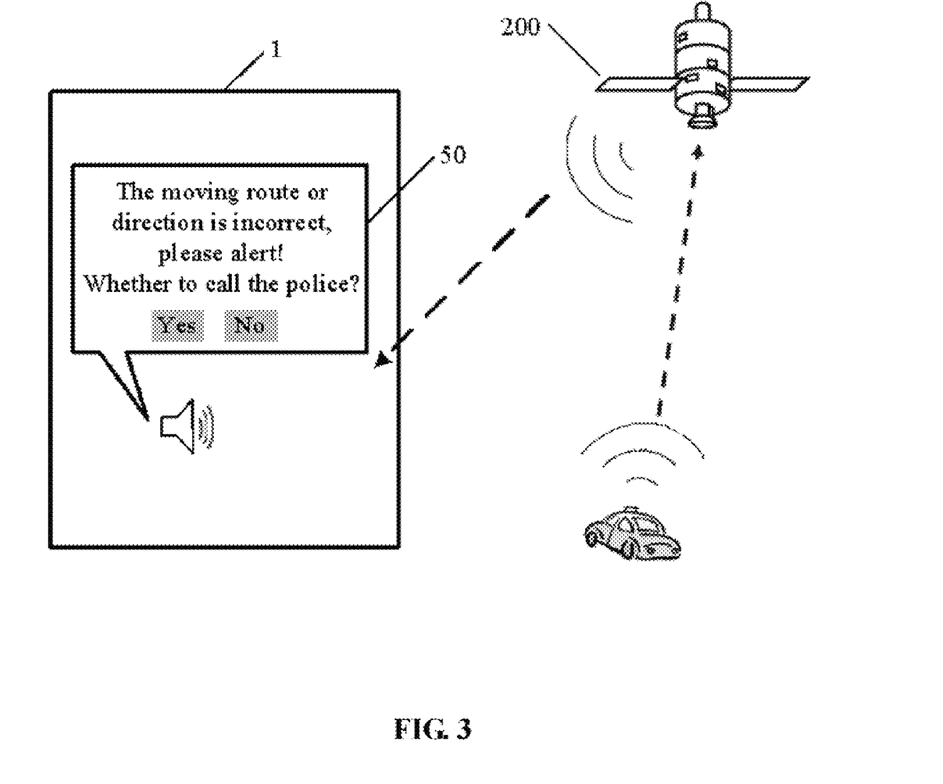
FIG. 3 is a schematic diagram illustrating another example of a display of the electronic device.

In some embodiments, the notification module 103 further generates a text message to display on the display screen 12 and prompt whether to call the police department, such as the text message 50 of FIG. 3. If the user agrees, the implementation module 105 sends a request message to the police department, and the current location of the electronic device 1 may also be sent to the police department.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A transportation information management method using an electronic device, the method comprising:
　(a) setting a departure location and a destination for a user;
　(b) determining a mode of transportation for the user from the departure location to the destination, wherein the mode of transportation is selected from public transportation and private transportation;
　upon the condition that the mode of transportation is the public transportation, executing block (c)-(e):
　(c) detecting a current location of the electronic device in real time using a navigation device of the electronic device;
　(d) determining whether a distance between the current location and the destination is less than a predetermined distance; and (e) generating a first notification to inform the user to prepare to disembark, if the distance is less than the predetermined distance;

upon the condition that the mode of transportation is the private transportation executing block (f)-(j):

(f) calculating feasible navigation routes from the departure location to the destination;

(g) detecting the current location of the electronic device in real time using the navigation device;

(h) determining whether a driving route and direction of the private transportation are correct according to the current location, the destination, and the feasible navigation routes, wherein the determining step comprises: determining that the driving route is correct, if the current location of the electronic device is included in one of the feasible navigation routes; determining that the driving route is incorrect, if the current location of the electronic device is included in none of the feasible navigation routes; determining that the driving direction is correct, if the distance between the current location of the electronic device and the destination along any of the feasible navigation routes decreases the time before arriving the destination, determining that the driving direction is incorrect, if the distance between the current location of the electronic device and the destination along any of the feasible navigation routes does not decrease the time before arriving the destination;

(i) generating a second notification to warn the user if the driving route or direction is determined incorrect; or (j) executing block (d) and (e) if the driving route and direction are correct.

2. The method according to claim 1, further comprising:
setting a private transportation fare and storing the private transportation fare in the storage system;
estimating cost of each of the feasible navigation routes according to the private transportation fare; and
displaying the estimated cost of each navigation route on a display screen of the electronic device.

3. The method according to claim 2, wherein the step (i) comprises:
generating a text message to display on the display screen to warn the user and prompt the user to decide whether to call a police department; and
sending a request message and the current location of the electronic device to the police department, if the user agrees to call the police department.

4. An electronic device, comprising:
a storage system;
at least one processor; and
one or more programs stored in the storage system and being executable by the at least one processor, the one or more programs comprising:
a setting module operable to set a departure location and a destination, and determine a mode of transportation for the user from the departure location to the destination, wherein the mode of transportation is selected from public transportation and private transportation;
a determination module operable to detect a current location of the electronic device using a navigation device of the electronic device in real time, and determine whether a distance between the current location and the destination is less than a predetermined distance; and
a notification module operable to generate a first notification to inform the user to prepare to disembark, if the distance is less than the predetermined distance;
a calculation module operable to calculate feasible navigation routes from the departure location to the destination if the mode of transportation is the private transportation;
the determination module further operable to determine whether a driving route and direction of the private transportation are correct according to the current location, the destination, and the feasible navigation routes, wherein the determining step comprises: determining that the driving route is correct, if the current location of the electronic device is included in one of the feasible navigation routes; determining that the driving route is incorrect, if the current location of the electronic device is included in none of the feasible navigation routes; determining that the driving direction is correct, if the distance between the current location of the electronic device and the destination along any of the feasible navigation routes decreases the time before arriving the destination, determining that the driving direction is incorrect, if the distance between the current location of the electronic device and the destination along any of the feasible navigation routes does not decrease the time before arriving the destination.

5. The electronic device according to claim 4, wherein the notification module is further operable to generate a second notification to warn the user that the driving route or direction of the private transportation is incorrect and generate a text message to display on the display screen to warn the user and prompt the user to decide whether to call a police department, if the driving route or direction is determined incorrect.

6. The electronic device according to claim 5, wherein the one or more programs further comprise:
an implementation module operable to send a request message and the current location of the electronic device to the police department, if the user agrees to call the police department.

7. The electronic device according to claim 4, wherein the setting module is further operable to set a private transportation fare and store the set in the storage system.

8. The electronic device according to claim 7, wherein the calculation module is further operable to estimate cost of each of the feasible navigation routes according to the private transportation fare, and display the estimated cost of each of the navigation routes on a display screen of the electronic device.

9. A non-transitory storage medium storing a set of instructions, the set of instructions capable of being executed by a processor of an electronic device, causing the electronic device to perform a transportation information management method, the method comprising:
(a) setting a departure location and a destination for a user;
(b) determining a mode of transportation for the user from the departure location to the destination, wherein the mode of transportation is selected from public transportation and private transportation;
upon the condition that the mode of transportation is the public transportation, executing block (c)-(e):
(c) detecting a current location of the electronic device in real time using a navigation device of the electronic device;
(d) determining whether a distance between the current location and the destination is less than a predetermined distance; and
(e) generating a first notification to inform the user to prepare to disembark, if the distance is less than the predetermined distance;

upon the condition that the mode of transportation is the private transportation executing block (f)-(j):

(f) calculating feasible navigation routes from the departure location to the destination;

(g) detecting the current location of the electronic device in real time using the navigation device;

(h) determining whether a driving route and direction of the private transportation are correct according to the current location, the destination, and the feasible navigation routes, wherein the determining step comprises: determining that the driving route is correct, if the current location of the electronic device is included in one of the feasible navigation routes; determining that the driving route is incorrect, if the current location of the electronic device is included in none of the feasible navigation routes; determining that the driving direction is correct, if the distance between the current location of the electronic device and the destination along any of the feasible navigation routes decreases the time before arriving the destination, determining that the driving direction is incorrect, if the distance between the current location of the electronic device and the destination along any of the feasible navigation routes does not decrease the time before arriving the destination;

(i) generating a second notification to warn the user if the driving route or direction is determined incorrect; or (j) executing block (d) and (e) if the driving route and direction are correct.

10. The non-transitory storage medium as claimed in claim 9, wherein the method further comprises:

setting a private transportation fare and storing the private transportation fare in the storage system;

estimating cost of each of the feasible navigation routes according to the private transportation fare; and displaying the estimated cost of each navigation route on a display screen of the electronic device.

11. The non-transitory storage medium as claimed in claim 9, wherein the step (i) comprises:

generating a text message to display on the display screen to warn the user and prompt the user to decide whether to call a police department; and sending a request message and the current location of the electronic device to the police department, if the user agrees to call the police department.

* * * * *